United States Patent
Woo et al.

(10) Patent No.: US 11,205,793 B2
(45) Date of Patent: Dec. 21, 2021

(54) FUEL SUPPLY MODULE, AND FUEL REFORMING APPARATUS FOR FUEL CELL USING THE SAME

(71) Applicant: LG ELECTRONICS INC., Seoul (KR)

(72) Inventors: Hyoung Suk Woo, Seoul (KR); Dong Keun Yang, Seoul (KR); Woojin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 16/683,361

(22) Filed: Nov. 14, 2019

(65) Prior Publication Data

US 2020/0153014 A1 May 14, 2020

(30) Foreign Application Priority Data

Nov. 14, 2018 (KR) .......................... 10-2018-0140123

(51) Int. Cl.
*H01M 8/0612* (2016.01)
(52) U.S. Cl.
CPC ................................. *H01M 8/0618* (2013.01)
(58) Field of Classification Search
CPC ................................................... H01M 8/0618
See application file for complete search history.

(56) References Cited

U.S. PATENT DOCUMENTS

2003/0077210 A1 4/2003 Nau et al.
2005/0221137 A1 10/2005 Bandhauer et al.

FOREIGN PATENT DOCUMENTS

DE 19907362 8/2000
JP S63-254675 10/1988

OTHER PUBLICATIONS

European Search Report dated Jul. 2, 2020 issued in Application No. 19208826.8.

*Primary Examiner* — Brian R Ohara
(74) *Attorney, Agent, or Firm* — KED & Associates LLP

(57) ABSTRACT

Disclosed are a fuel supply module that may maintain an entrainment ratio in a constant range even under a load change, and a fuel reforming apparatus for a fuel cell using the same. The fuel supply module includes: a water vapor storage for storing water vapor therein; a fuel storage for storing fuel therein; a mixer having a first inlet, a second inlet, and an outlet; a first inlet pipe for connecting the water vapor storage and the first inlet of the mixer with each other; a second inlet pipe for connecting the fuel storage and the second inlet of the mixer with each other; an outlet pipe connected to the outlet of the mixer; and a bypass pipe having one end connected to the first inlet pipe and the other end connected to the outlet pipe.

12 Claims, 4 Drawing Sheets

[FIG. 1]
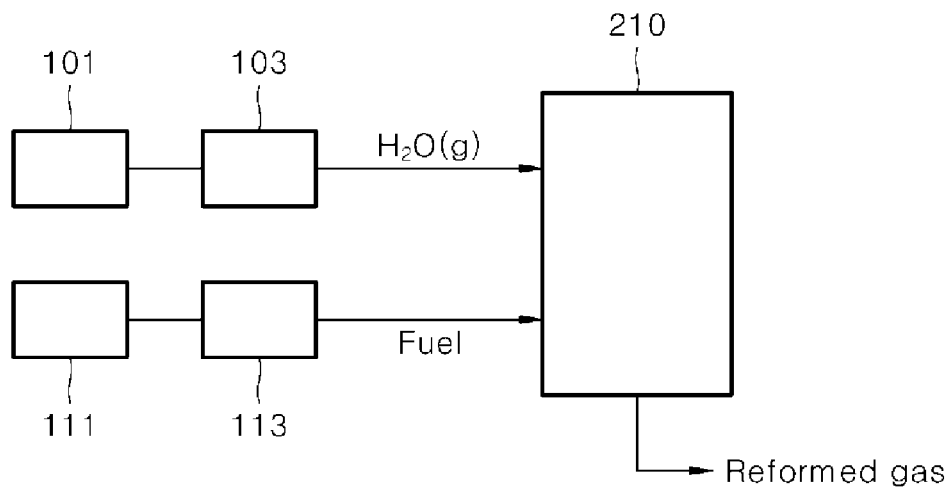
[FIG. 2]
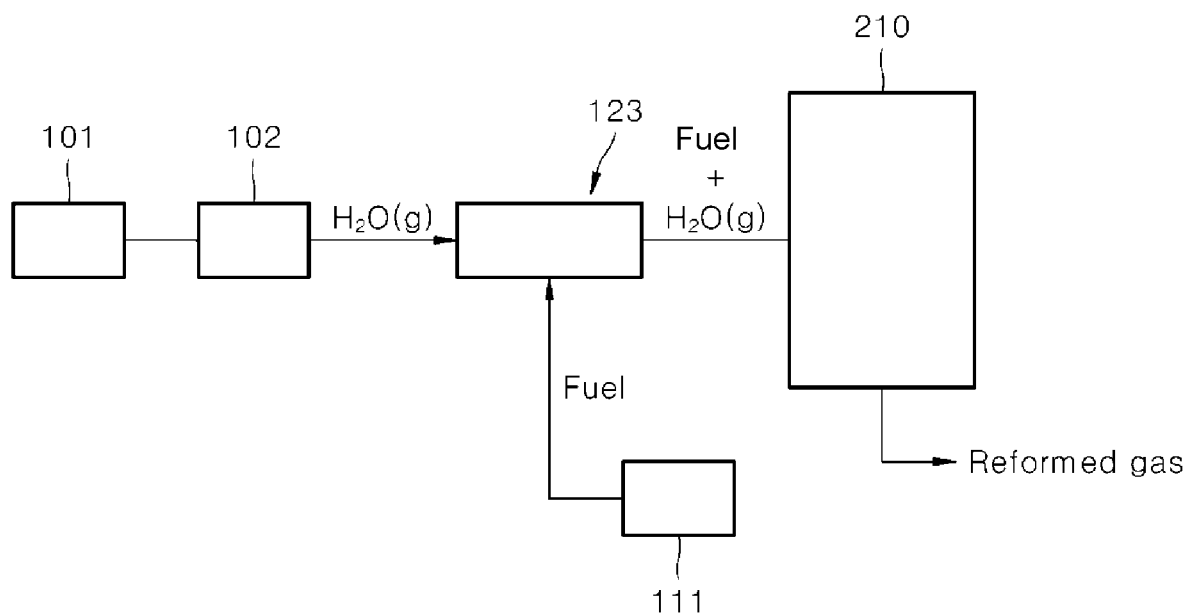

[FIG. 3]
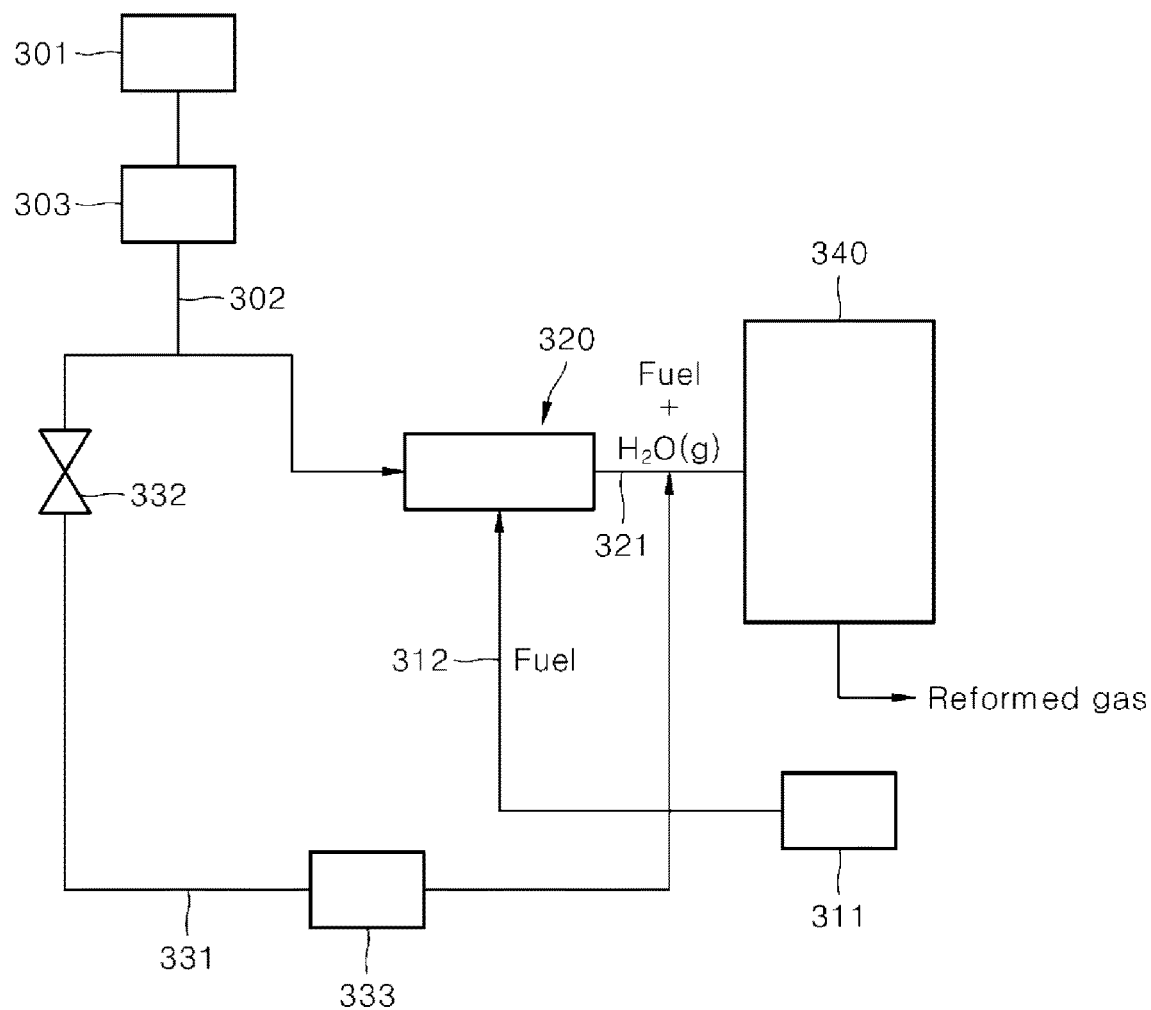
[FIG. 4]
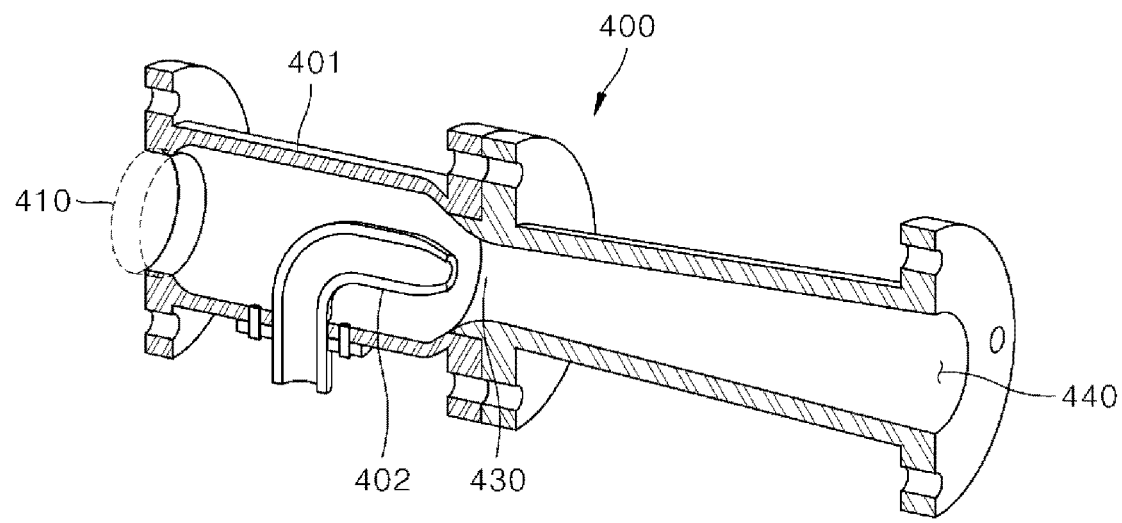

[FIG. 5]
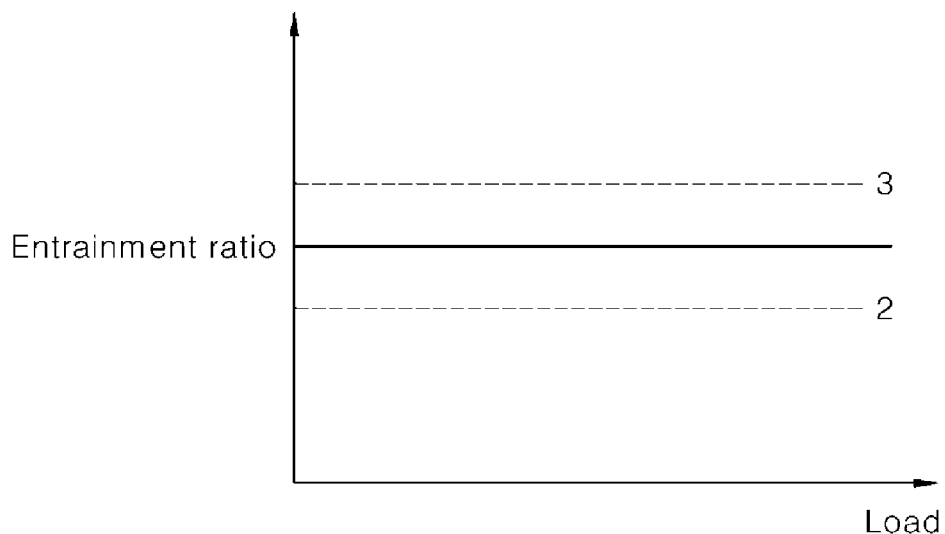
[FIG. 6]
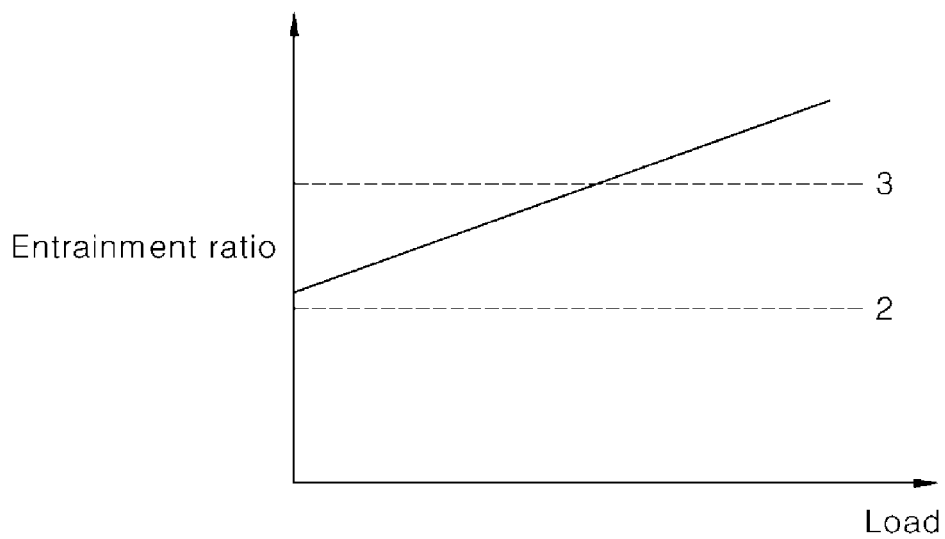

[FIG. 7]
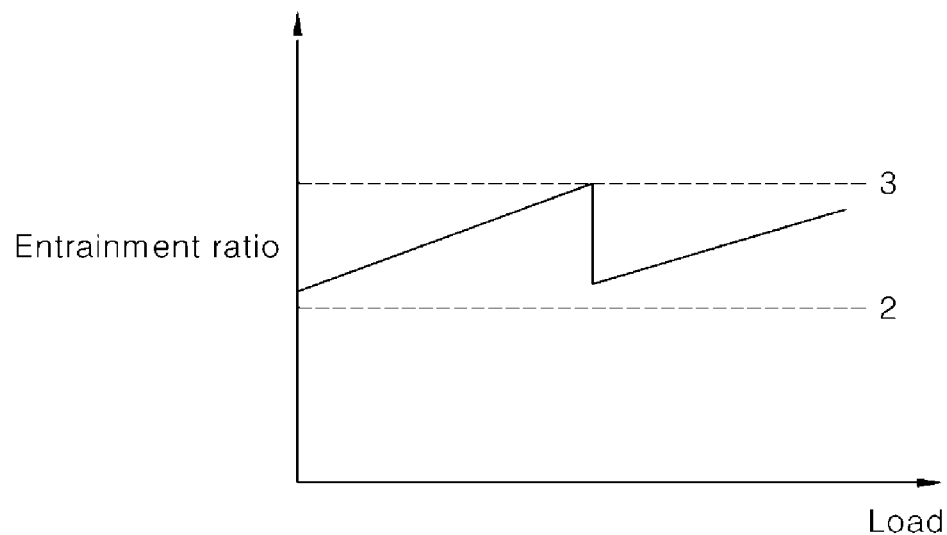
[FIG. 8]
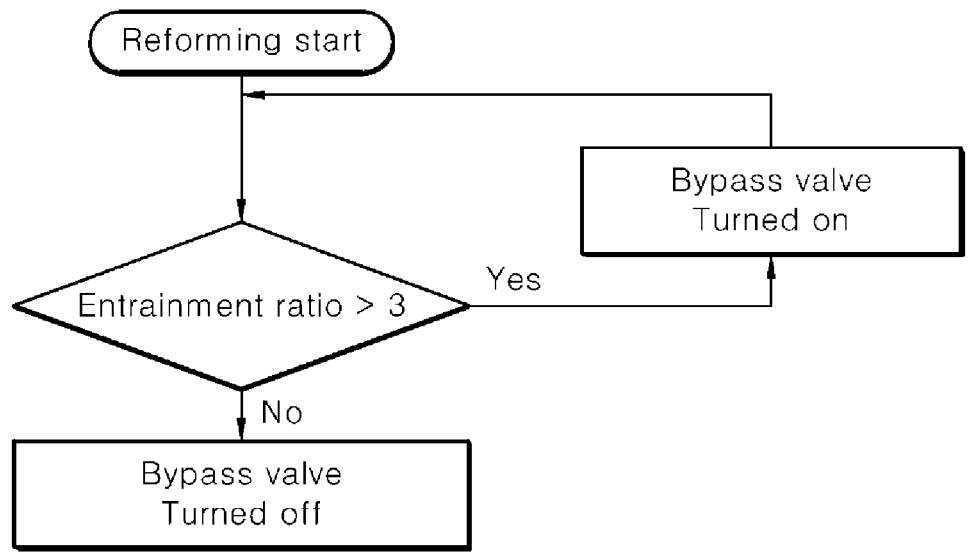

FUEL SUPPLY MODULE, AND FUEL REFORMING APPARATUS FOR FUEL CELL USING THE SAME

CROSS-REFERENCE TO RELATED APPLICATIONS

This application claims the priority of Korean Patent Application No. 10-2018-0140123 filed on Nov. 14, 2018, in the Korean Intellectual Property Office, the disclosure of which is hereby incorporated by reference in its entirety.

BACKGROUND

1. Technical Field

The present disclosure relates to a fuel supply module and a fuel reforming apparatus for a fuel cell using the same.

More specifically, the present disclosure relates to a fuel supply module capable of maintaining an entrainment ratio in a constant range even under a load change, and to a fuel reforming apparatus for a fuel cell using the same.

2. Description of the Related Art

A fuel cell system is configured to convert chemical energy contained in a fuel into electrical energy via an electrochemical reaction. The fuel cell system includes a cell stack that generates electricity via the electrochemical reaction of oxygen and hydrogen. Further, the fuel cell system includes a fuel reforming apparatus for supplying hydrogen to the cell stack.

The fuel reforming apparatus includes a reformer for reforming hydrocarbon fuels such as LNG, coal gas and methanol to hydrogen using water vapor. In other words, the reforming reaction in the reformer is based on a chemical reaction between hydrocarbon fuel and water vapor. Hydrocarbon fuel and water vapor are supplied to the reformer through the fuel supply module.

FIG. 1 shows an example of a fuel reforming apparatus that includes a conventional fuel supply module.

Referring to FIG. 1, the fuel supply module includes a steam generator 101 and a steam pump 103 for supplying water vapor to the reformer, and a fuel storage 111 and an air blower 113 for supplying fuel to the reformer. The steam pump 103 and air blower 113 serve to supply water vapor and fuel quickly and in a constant manner, respectively. In the fuel supply module shown in FIG. 1, water vapor and fuel are supplied to the reformer through separate supply lines respectively.

Since the water vapor and fuel are supplied to the reformer via separate supply lines respectively, fuel and water vapor may be supplied to the reformer 210 at a constant entrainment ratio. In the present specification, the entrainment ratio (m1/m2) means a fuel supply flow rate (m1)/water vapor supply flow rate (m2) as supplied to the reformer based on a volume. However, the air blower 113 is not only very expensive but also it is difficult to control the air blower 113. The use of the air blower 113 has a problem of lowering the system power generation efficiency due to the increase of parasitic power.

Further, in the fuel supply module shown in FIG. 1, water vapor and fuel are supplied to the reformer 210 through separate supply lines respectively. Thus, an additional space where the water vapor and fuel may be sufficiently mixed with each other inside the reformer 210 is required.

FIG. 2 shows another example of a fuel reforming apparatus that includes a conventional fuel supply module.

Referring to FIG. 2, unlike the example shown in FIG. 1, instead of omitting the air blower 113 in the fuel supply module, an ejector 123 is provided. Water vapor and fuel are premixed with each other in the ejector 123 and the mixture is then fed to the reformer 210.

In the fuel supply module shown in FIG. 2, not only the air blower having difficulty in controlling the air blower may be omitted, but also the water vapor and fuel may be mixed with each other in the ejector 123 of the fuel supply module. Thus, the space for mixing the water vapor and fuel in the reformer 210 may be reduced.

However, in the fuel supply module shown in FIG. 2, as a load increases, the entrainment ratio also increases in proportion to the load. When the load increases, an amount of water vapor supply increases, and, thus, the ejector driving pressure increases, such that an amount of the fuel drawn into the ejector 123 increases greatly. This leads to an increase in the entrainment ratio.

When the entrainment ratio exceeds a predetermined value, this means that the supply amount of water vapor is relatively small compared to the supply amount of fuel. Accordingly, the amount of hydrogen generated by the reforming reaction in the reformer may decrease, while CO may increase. Therefore, there is a need to control the entrainment ratio in a predefined constant range even under the load fluctuations.

SUMMARY

A purpose of the present disclosure is to provide a fuel supply module for supplying fuel to a reformer, by which the problem occurring in supplying fuel through the conventional air blower may be removed, and by which the entrainment ratio is maintained in a predefined constant range under the load fluctuations to improve the fuel cell system efficiency.

Further, another purpose of the present disclosure is to provide a fuel reforming apparatus for a fuel cell using the novel fuel supply module, in which a stable reforming reaction may be carried out even under the load variation in the fuel cell system.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

A first aspect of the present disclosure provides a fuel supply module comprising: a water vapor storage for storing water vapor therein; a fuel storage for storing fuel therein; a mixer having a first inlet, a second inlet, and an outlet; a first inlet pipe for connecting the water vapor storage and the first inlet of the mixer with each other; a second inlet pipe for connecting the fuel storage and the second inlet of the mixer with each other; an outlet pipe connected to the outlet of the mixer; and a bypass pipe having one end connected to the first inlet pipe and the other end connected to the outlet pipe.

In one implementation of the first aspect, the mixer has a venturi tube structure.

In one implementation of the first aspect, the first inlet is disposed at a front end of the mixer, wherein the second inlet is disposed at a middle portion of the mixer, wherein the outlet is disposed at a rear end of the mixer.

In one implementation of the first aspect, the fuel supply module further includes a steam pump disposed in the first inlet pipe.

In one implementation of the first aspect, the fuel supply module further includes a valve disposed at the bypass pipe.

In one implementation of the first aspect, the fuel supply module further includes a capillary tube disposed at the bypass pipe.

A second aspect of the present disclosure provides a fuel supply module comprising: a first inlet pipe to receive water vapor; a second inlet pipe to receive fuel; an ejector having a first inlet connected to the first inlet pipe, a second inlet connected to the second inlet pipe, and an outlet through which a mixture of the water vapor and fuel is discharged; an outlet pipe having one end connected to the outlet of the ejector, and the other end connected to a reformer; and a bypass pipe branching from the first inlet pipe and merging with the outlet pipe.

In one implementation of the second aspect, the first inlet is disposed at a front end of the ejector, wherein the second inlet is disposed inside a neck of the ejector, wherein the outlet is disposed at a rear end of the ejector.

In one implementation of the second aspect, the fuel supply module further includes a steam pump disposed in the first inlet pipe.

In one implementation of the second aspect, the fuel supply module further includes a valve disposed at the bypass pipe.

In one implementation of the second aspect, the valve is opened when a ratio of a fuel supply flow rate to a water vapor supply flow rate supplied to the ejector or a ratio of a fuel supply flow rate to a water vapor supply flow rate supplied to the reformer exceeds a predetermined value.

In one implementation of the second aspect, the fuel supply module further includes a capillary tube disposed at the bypass pipe.

A third aspect of the present disclosure provides an apparatus for reforming fuel for a fuel cell, the apparatus comprising: a reformer; a first inlet pipe to receive water vapor; a second inlet pipe to receive fuel; an ejector having a first inlet connected to the first inlet pipe, a second inlet connected to the second inlet pipe, and an outlet through which a mixture of the water vapor and fuel is discharged; an outlet pipe having one end connected to the outlet of the ejector, and the other end connected to a reformer; a bypass pipe branching from the first inlet pipe and merging with the outlet pipe; and a valve disposed at the bypass pipe, wherein the valve is opened when a ratio of a fuel supply flow rate to a water vapor supply flow rate supplied to the ejector or a ratio of a fuel supply flow rate to a water vapor supply flow rate supplied to the reformer exceeds a predetermined value.

In one implementation of the third aspect, the first inlet is disposed at a front end of the ejector, wherein the second inlet is disposed inside a neck of the ejector, wherein the outlet is disposed at a rear end of the ejector.

In one implementation of the third aspect, the apparatus further includes a steam pump disposed in the first inlet pipe.

In one implementation of the third aspect, the apparatus further includes a capillary tube disposed at the bypass pipe.

Effects of the present disclosure may be as follows but may not be limited thereto.

The fuel supply module according to the present disclosure may use a combination of the mixer such as the ejector and the bypass line to control the entrainment ratio to be in a predefined constant range even under the load fluctuations of the fuel cell system. Thus, the amounts of the water vapor and fuel supplied to the reformer may be maintained in a predefined constant range. Thus, the reformer efficiency may be maintained even under load fluctuations of the fuel cell system. Further, a stable reforming reaction may be carried out even under the load variation in the fuel cell system.

In addition to the effects as described above, specific effects of the present disclosure will be described together with the detailed description for carrying out the disclosure.

BRIEF DESCRIPTION OF DRAWINGS

FIG. 1 shows an example of a fuel reforming apparatus that includes a conventional fuel supply module.

FIG. 2 shows another example of a fuel reforming apparatus that includes a conventional fuel supply module.

FIG. 3 shows an example of a fuel reforming apparatus that includes a fuel supply module according to the present disclosure.

FIG. 4 shows an example of an ejector applicable to a fuel supply module according to the present disclosure.

FIG. 5 shows a change in an entrainment ratio based on a load variation of a structure shown in FIG. 1.

FIG. 6 shows a change in an entrainment ratio based on a load variation of a structure shown in FIG. 2.

FIG. 7 shows a change in an entrainment ratio based on a load variation of a structure shown in FIG. 3.

FIG. 8 schematically shows a bypass line operation method based on an entrainment ratio.

DETAILED DESCRIPTIONS

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a fuel supply module and a fuel cell system using the same according to some embodiments of the present disclosure will be described.

FIG. 3 shows an example of a fuel reforming apparatus that includes a fuel supply module according to the present disclosure.

Referring to FIG. 3, a fuel supply module according to the present disclosure includes a water vapor storage 301, a first inlet pipe 302, a fuel storage 311, a second inlet pipe 312, a mixer 320, an outlet pipe 321, and a bypass pipe 331.

The water vapor storage 301 stores therein gaseous water, that is, water vapor. In another example, the water vapor storage 301 may be embodied as a steam generator.

The fuel storage 311 stores hydrocarbon fuels therein.

The mixer 320 has a first inlet, a second inlet, and an outlet. The mixer 320 receives water vapor and fuel through the first inlet and the second inlet respectively, and then mixes the water vapor and the fuel inside the mixer, and discharges the mixture of the water vapor and the fuel through the outlet.

The first inlet pipe 302 serves to connect the water vapor storage 301 and the first inlet of the mixer 320. In order to supply the water vapor stably, the first inlet pipe 302 may be further provided with a steam pump 303.

The second inlet pipe 312 connects the fuel inlet 311 and the second inlet of the mixer 320 with each other.

The outlet pipe 321 has one end connected to the outlet of the mixer 320 and the other end connected to the inlet of the reformer 340, thereby connecting the mixer 320 and the reformer 340 with each other. The bypass pipe 331 branches from the first inlet pipe 302 and merges into the outlet pipe 321 of the mixer. More specifically, the bypass pipe 331 has one end connected to the first inlet pipe 302, and the other end connected to the outlet pipe 321. A three-way valve (not shown) may be further disposed at each of a branching portion of the first inlet pipe where the bypass pipe 331 starts and of a merged portion of the outlet pipe where the bypass pipe 331 ends.

In accordance with the present disclosure, the bypass pipe 331 is activated based on an entrainment ratio, which means a ratio of a fuel supply flow rate to a water vapor supply flow rate. For example, when a load of the fuel cell system is not large, a pressure fluctuation inside the ejector is not large. Thus, a ratio of the water vapor and fuel flow rates may be maintained in a constant manner, thereby to stably supply a mixture of the water vapor and fuel to the reformer. Therefore, in this case, the bypass pipe 331 does not need to be activated because the entrainment ratio is constant or because even when the ratio increases, the increase is small.

However, when the load of the fuel cell system increases, the pressure on the ejector inlet increases due to an increase in the amount of the water vapor supplied to the ejector. As a result, the amount of the fed fuel is greatly increased, leading to an increase in the entrainment ratio. When the entrainment ratio exceeds a predetermined value, a ratio of a fuel supply flow rate compared to a water vapor supply rate significantly increases. Thus, a reforming reaction is insufficient in the reformer. This results in an increase in the amount of CO while reducing the amount of hydrogen as produced from the reforming reaction in the reformer.

Therefore, in this case, the entrainment ratio is lowered by supplying additional water vapor to the reformer through the bypass pipe 331. In this manner, the entrainment ratio may be controlled to be a predefined constant range even under the load variation of the fuel cell system.

The bypass pipe may be further provided with a valve 332. Opening and closing of valve 332 may determine whether the additional water vapor is supplied. That is, when the valve 332 is open, additional water vapor is supplied to the reformer through the bypass pipe. When the valve 332 is closed, water vapor is supplied only to the ejector. For example, when the entrainment ratio exceeds a predetermined value due to an increase in the load of the fuel cell system, the valve 332 is opened so that a portion of the water vapor is supplied to the reformer via the bypass pipe and added to the water vapor-fuel mixture as supplied through the ejector. As a result, a ratio of the amounts of water vapor and fuel supplied to the reformer may be maintained in a constant range. Therefore, the entrainment ratio may be controlled to be in a predefined constant range even under the load variation.

Further, a capillary tube 333 may be further disposed on the bypass pipe 331. The capillary tube 333 may use a capillary expansion phenomenon. Placing the capillary tube 333 on the bypass pipe 331 may allow the bypass pipe flow rate to be controlled. In one example, the bypass pipe flow rate may be determined based on a length of the capillary tube 333 and a tube diameter.

In one example, the mixer 320 may have a venturi tube structure having a relatively narrow central flow path width compared to front end and rear end flow path widths. In the venturi tube, a flow passage narrows and then widens again.

According to Bernoulli's theorem, when the wider channel width becomes relatively narrow, a pressure of a first fluid is lowered, which allows a second fluid to be supplied to the relatively narrow area due to the reduced pressure. A representative example of the mixer using the venturi tube structure may include an ejector as shown in FIG. 4.

Referring to FIG. 4, the ejector 400 includes a main body 401 of a venturi tube structure and a suction tube 402 penetrating one side of the main body and having an outlet in the main body. Further, the ejector 400 includes a front end 410, a neck 430 and a rear end 440.

The first inlet to which the water vapor is supplied may correspond to the front end 410 of the ejector. The second inlet to which fuel is supplied corresponds to the end of the suction tube 402, and may be placed inside the neck 430 of the ejector. An outlet through which the mixture of water vapor and fuel mixed inside the ejector is discharged may be disposed at the rear end 440 of the ejector.

Water vapor passes through a flow path formed along the front end 410, neck 430 and rear end 440 of the ejector 400. The fuel passes through a flow path formed along the neck 430 and rear end 440 of the ejector. The water vapor passes through the front end 410 of the ejector and then depressurizes while passing through the narrow neck 430, thereby to draw the fuel into the ejector. Water vapor and fuel are mixed in the flow path formed along the neck 430 and rear end 440 of the ejector.

The water vapor has the large volume expansion ratio. Thus, the pressure fluctuation of the ejector front end 410 is large based on the change of the supply amount thereof. Accordingly, when the water vapor supply increases due to the increase in the load of the fuel cell system, the pressure at the ejector front end 410 increases greatly. As a result, when more amount of fuel than necessary may be drawn in such that the entrainment ratio may be abnormally increased. When the amount of water vapor is relatively insufficient compared to the amount of fuel, an insufficient reforming reaction in the reformer may cause the problem that the amount of hydrogen produced from the reforming reaction decreases while the CO increases. However, as indicated in accordance with the present disclosure, when the bypass flow path is disposed, a certain amount of water vapor may be supplied to the reformer without passing through the ejector, so that a ratio of the amounts of water vapor and fuel supplied to the reformer may be adjusted within a constant range.

FIG. 5 shows a change in an entrainment ratio based on a load variation of the structure shown in FIG. 1. FIG. 6 shows a change in an entrainment ratio based on a load variation of the structure shown in FIG. 2. FIG. 7 shows a change in an entrainment ratio based on a load variation of the structure shown in FIG. 3.

In the fuel supply module shown in FIG. 1, water vapor and fuel are supplied to the reformer via separate supply pipes respectively. In this case, a constant entrainment ratio may be maintained as shown in FIG. 5. However, as described above, the air blower is expensive and it is difficult to control the blower. The reformer size is increased because the reformer needs to have a sufficient space for mixing water vapor and fuel therein.

In the fuel supply module shown in FIG. 2, the ejector is used to supply a mixture of fuel and water vapor to the reformer. In this case, however, as the load of the fuel cell system increases, the entrainment ratio may also increase proportionally. When the entrainment ratio is significantly increased, there is a problem that the fuel cell system efficiency is lowered.

The fuel supply module as shown in FIG. 3 may be configured such that the additional bypass pipe is included in the fuel supply module shown in FIG. 2. In this case, the entrainment ratio increases as the load of the fuel cell system increases. However, when the entrainment ratio exceeds a specific value as shown in FIG. 7, the water vapor may be additionally supplied to the reformer through the bypass pipe without passing through the ejector. Thus, the entrainment ratio may be lowered again to keep the entrainment ratio within a certain constant range (for example, 2 to 3). That is, in accordance with the present disclosure, even though the load variation of the fuel cell system occurs, the system efficiency deterioration may be prevented by maintaining the entrainment ratio within a specific range.

FIG. 8 schematically shows a bypass pipe operation method based on the entrainment ratio.

Referring to FIG. 8, after the start of the reforming, the entrainment ratio (SC), as a ration between the water vapor flow rate and fuel flow rate supplied to the ejector or reformer is monitored.

When the entrainment ratio does not exceed a predefined value (3 in FIG. 8), the water vapor and fuel are supplied to the reformer through the ejector while turning off the valve included in the bypass pipe.

On the other hand, when the entrainment ratio exceeds the predetermined value, the valve included in the bypass pipe is turned on, thereby to supply additional water vapor to the reformer through the bypass pipe to lower the entrainment ratio. This allows the ratio of flow rates of water vapor and fuel supplied to the reformer to be maintained in a predefined constant range.

As described above, the fuel supply module according to the present disclosure includes a bypass pipe together with a mixer such as an ejector. When the entrainment ratio increases, the bypass pipe may be used to control the entrainment ratio into a predefined constant range even as the load of the fuel cell system increases.

Although the present disclosure has been described with reference to the drawings illustrating the present disclosure, the present disclosure is not limited to the embodiments and drawings disclosed in the present specification. It will be apparent that various modifications may be made by those skilled in the art within the scope of the present disclosure. In addition, it should be appreciated that effects to be achieved from configurations of the present disclosure as not expressly mentioned may be acknowledged.

What is claimed is:

1. A fuel supply module comprising:
a water vapor storage for storing water vapor therein;
a fuel storage for storing fuel therein;
a mixer having a first inlet which is provided at a front end of the mixer, a second inlet which is provided at a middle portion of the mixer, and an outlet which is provided at a rear end of the mixer, wherein a path width of the middle portion of the mixer is narrower than a path width of the front end of the mixer or a path width of the rear end of the mixer;
a first inlet pipe for connecting the water vapor storage and the first inlet of the mixer with each other;
a second inlet pipe for connecting the fuel storage and the second inlet of the mixer with each other;
an outlet pipe for connecting the outlet of the mixer and a reformer;
a bypass pipe having one end connected to the first inlet pipe and the other end connected to the outlet pipe; and
a valve provided at a bypass pipe, wherein the valve is opened when at least one of a ratio of a fuel supply flow rate to a water vapor supply flow rate supplied to the mixer or a ratio of a fuel supply flow rate to a water vapor supply flow rate supplied to the reformer exceeds a particular value.

2. The fuel supply module of claim 1, wherein the mixer has a venturi tube structure.

3. The fuel supply module of claim 2, further comprising a steam pump disposed in the first inlet pipe.

4. The fuel supply module of claim 1, further comprising a capillary tube disposed at the bypass pipe.

5. A fuel supply module comprising:
- a first inlet pipe to receive water vapor;
- a second inlet pipe to receive fuel;
- an ejector having a first inlet provided at a front end of the ejector and connected to the first inlet pipe, a second inlet provided inside a neck of the ejector and connected to the second inlet pipe, and an outlet provided at a rear end of the ejector and through which a mixture of the water vapor and fuel is discharged, wherein a path width of the neck of the ejector is narrower than a path width of the front end of the ejector or a path width of the rear end of the ejector;
- an outlet pipe having one end connected to the outlet of the ejector, and the other end connected to a reformer; and
- a bypass pipe branching from the first inlet pipe and merging with the outlet pipe.

6. The fuel supply module of claim 5, further comprising a steam pump disposed in the first inlet pipe.

7. The fuel supply module of claim 5, further comprising a valve disposed at the bypass pipe.

8. The fuel supply module of claim 7, wherein the valve is opened when a ratio of a fuel supply flow rate to a water vapor supply flow rate supplied to the ejector or a ratio of a fuel supply flow rate to a water vapor supply flow rate supplied to the reformer exceeds a predetermined value.

9. The fuel supply module of claim 7, further comprising a capillary tube disposed at the bypass pipe.

10. An apparatus for reforming fuel for a fuel cell, the apparatus comprising:
- a first inlet pipe to receive water vapor;
- a second inlet pipe to receive fuel;
- an ejector having a first inlet provided at a front end of the ejector and connected to the first inlet pipe, a second inlet provided inside a neck of the ejector and connected to the second inlet pipe, and an outlet provided at a rear end of the ejector and through which a mixture of the water vapor and fuel is discharged, wherein a path width of the neck of the ejector is narrower than a path width of the front end of the ejector or a path width of the rear end of the ejector;
- an outlet pipe having one end connected to the outlet of the ejector;
- a reformer connected to the other end of the outlet pipe;
- a bypass pipe branching from the first inlet pipe and merging with the outlet pipe; and
- a valve disposed at the bypass pipe,
- wherein the valve is opened when at least one of a ratio of a fuel supply flow rate to a water vapor supply flow rate supplied to the ejector or a ratio of a fuel supply flow rate to a water vapor supply flow rate supplied to the reformer exceeds a predetermined value.

11. The apparatus of claim 10, further comprising a steam pump disposed in the first inlet pipe.

12. The apparatus of claim 10, further comprising a capillary tube disposed at the bypass pipe.

* * * * *